United States Patent
Sindia et al.

(10) Patent No.: US 10,073,138 B2
(45) Date of Patent: Sep. 11, 2018

(54) EARLY DETECTION OF RELIABILITY DEGRADATION THROUGH ANALYSIS OF MULTIPLE PHYSICALLY UNCLONABLE FUNCTION CIRCUIT CODES

(71) Applicant: Intel Corporation, Santa Clara, CA (US)

(72) Inventors: Suraj Sindia, Hillsboro, OR (US); Robert Kwasnick, Palo Alto, CA (US); Dhruv Singh, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/979,301

(22) Filed: Dec. 22, 2015

(65) Prior Publication Data

US 2017/0176527 A1    Jun. 22, 2017

(51) Int. Cl.
| | |
|---|---|
| *H04L 9/00* | (2006.01) |
| *G01R 31/317* | (2006.01) |
| *G01R 31/3177* | (2006.01) |
| *H04L 9/08* | (2006.01) |
| *H04L 9/32* | (2006.01) |

(52) U.S. Cl.
CPC ... *G01R 31/31703* (2013.01); *G01R 31/3177* (2013.01); *H04L 9/0866* (2013.01); *H04L 9/0891* (2013.01); *H04L 9/3278* (2013.01); *H04L 2209/34* (2013.01)

(58) Field of Classification Search
None
See application file for complete search history.

(56) References Cited

U.S. PATENT DOCUMENTS

| | | | |
|---|---|---|---|
| 6,721,077 B2 | 4/2004 | Kwasnick et al. | |
| 6,822,256 B2 | 11/2004 | Kwasnick et al. | |
| 6,822,389 B2 | 11/2004 | Kwasnick et al. | |
| 6,934,064 B2 | 8/2005 | Kwasnick et al. | |
| 7,027,015 B2 | 4/2006 | Booth, Jr. et al. | |
| 7,681,066 B2 | 3/2010 | Apparao et al. | |
| 2007/0011535 A1* | 1/2007 | Anzou | G11C 29/40 714/733 |
| 2011/0113303 A1* | 5/2011 | Bedeschi | G06F 11/1048 714/763 |
| 2013/0061101 A1* | 3/2013 | Fitzpatrick | G11C 29/50004 714/718 |
| 2014/0047285 A1* | 2/2014 | Baranwal | G11C 29/08 714/718 |
| 2016/0172056 A1* | 6/2016 | Huh | G11C 16/349 714/719 |
| 2016/0203047 A1* | 7/2016 | No | G06F 11/1068 714/764 |

OTHER PUBLICATIONS

Suh, et al., "Physical Unclonable Functions for Device Authentication and Secret Key Generation", DAC 2007, Jun. 4-8, 2007, San Diego, California, USA, Section 1.3, pp. 9-14.

* cited by examiner

*Primary Examiner* — Daniel McMahon
(74) *Attorney, Agent, or Firm* — Compass IP Law, PC

(57) ABSTRACT

An apparatus is described that includes a plurality of circuits each designed to exhibit a unique signature code that is determined from manufacturing tolerances associated with a manufacturing process used to manufacture the circuits. The apparatus also includes error circuitry to determine an error has arisen based on a change in signature codes from the plurality of circuits.

18 Claims, 6 Drawing Sheets

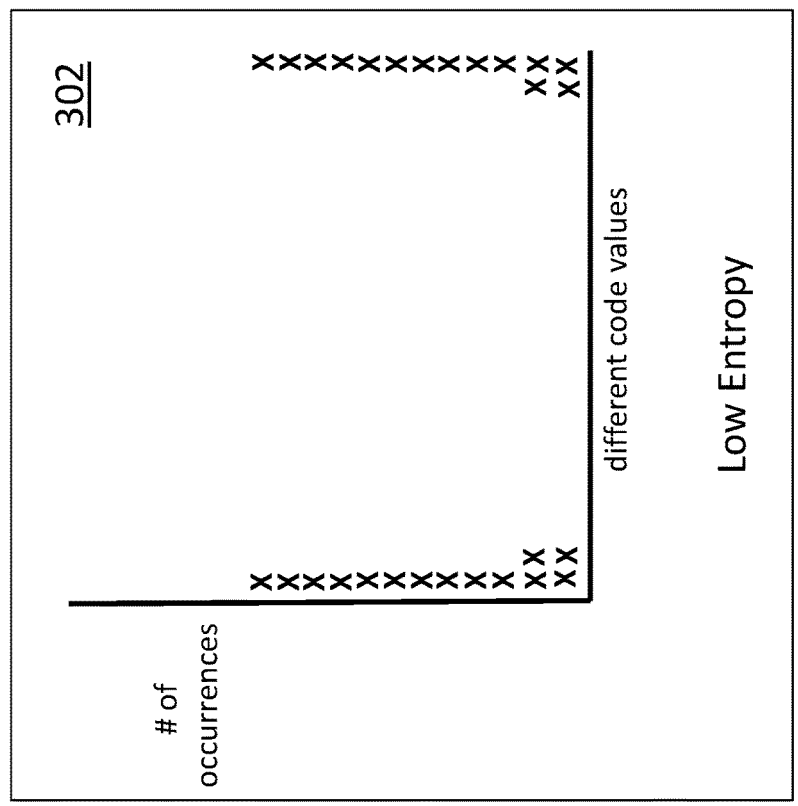
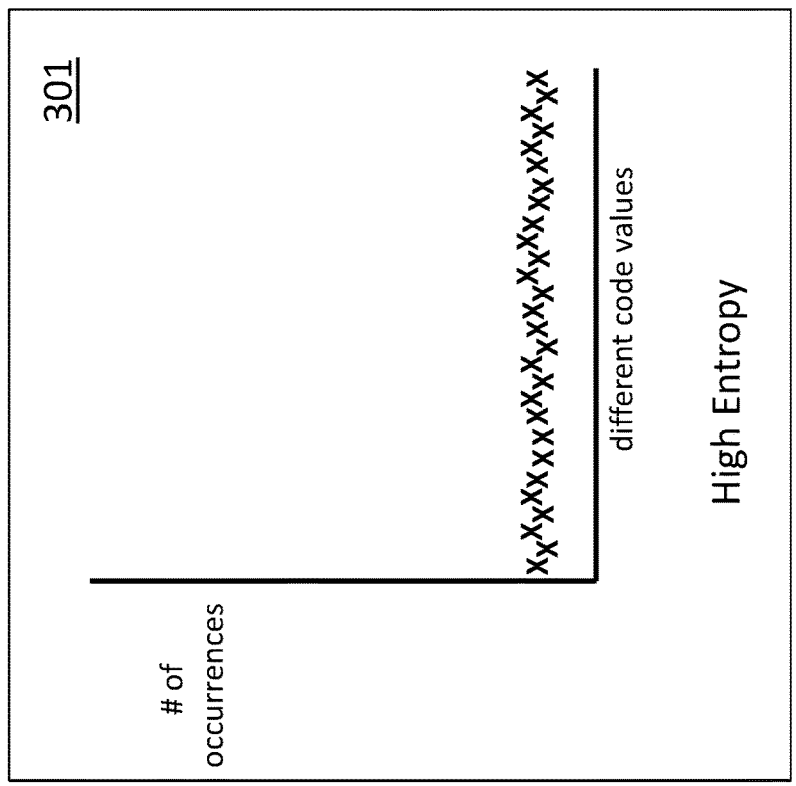
FIG. 3

EARLY DETECTION OF RELIABILITY DEGRADATION THROUGH ANALYSIS OF MULTIPLE PHYSICALLY UNCLONABLE FUNCTION CIRCUIT CODES

FIELD OF INVENTION

The field of invention pertains generally to the reliability of electronic devices, and, more specifically, to early detection of reliability degradation through analysis of multiple physically unclonable function circuit codes.

BACKGROUND

With the increased miniaturization of circuits and the dimensions of their constituent structures (e.g., transistors), reliability problems may become more prevalent particularly for circuits exposed to extreme environmental conditions (e.g., performance, temperature, etc.). As such, it behooves system designers to include embedded functions that detect the presence of a reliability issue before a catastrophic failure event occurs.

FIGURES

A better understanding of the present invention can be obtained from the following detailed description in conjunction with the following drawings, in which:

FIG. 3 shows high entropy and low entropy collections of signature codes;

DETAILED DESCRIPTION

Circuits are generally designed to be insensitive (as much as practicable) to manufacturing tolerances. However, a class of circuits may be designed that are purposefully sensitive to manufacturing tolerances (so called, "physically unclonable circuits"). For instance a circuit that is implemented on a semiconductor chip may be designed to have a measureable or determinable property that is highly sensitive to the threshold and/or the gain of its constituent transistors.

With significant sensitivity to certain parameters, and with the underlying manufacturing process having inherent variation with respect to these same parameters, identically designed instances of the circuit can exhibit noticeably different properties even if manufactured on the same semiconductor chip.

Figure 1:
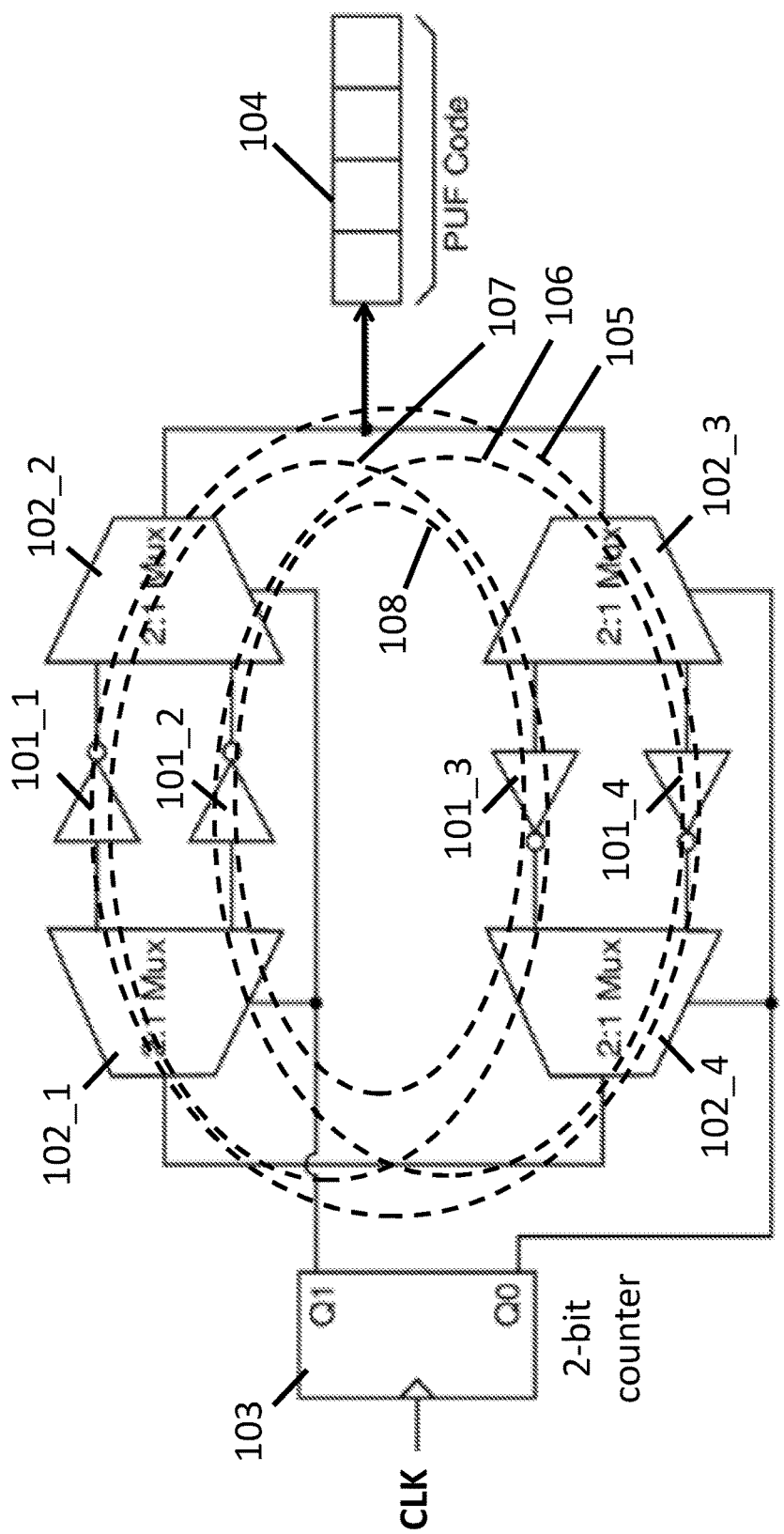
FIG. 1 shows a signature code generation circuit.

FIG. 1 shows an example of a circuit 100 that if implemented on a semiconductor chip will have properties that are highly sensitive to the threshold and gain of its constituent transistors. Further below, another circuit is described that, if implemented on a printed circuit board, is highly sensitive to the resistance and/or capacitance tolerances of the wiring traces of the printed circuit board's manufacturing process. For ease of overall comprehension, the present application will initially discuss embodiments directed to circuits implemented on a semiconductor chip and then address other embodiments directed to printed circuit board implementations.

As observed in FIG. 1 pair of multiplexed channels are arranged in an oscillating loop with each multiplexed channel having a pair of parallel inverters. Selection circuitry 103 (implemented as a 2 bit counter) presents four different states (e.g., 00, 01, 10, 11) with each state representing a different combination of inverters being coupled together within the loop. For example, a state of 00 may correspond to inverter 101_ 4 being coupled to inverter 101_1 (loop 105), a state of 01 may correspond to inverter 101_4 being coupled to inverter 101_2 (loop 106), a state of 10 may correspond to inverter 101_3 being coupled to inverter 101_2 (loop 107), and a state of 11 may correspond to inverter 101_3 being coupled to inverter 101_2 (loop 108).

As is known in the art, transistor gain variation and/or transistor threshold voltage variation can affect the time at which a driving inverter will cause a receiving inverter to flip its output bit. Specifically, a lower driving inverter gain and a higher receiving inverter threshold will cause the receiving inverter to flip its output bit later in time. By contrast, a higher driving inverter gain and a lower receiving inverter threshold will cause the receiving inverter to flip its output bit sooner in time. For simplicity only transistor gain and threshold have been mentioned. But other manufacturing related properties can affect the timing of an inverter chain as described above (e.g., interconnect resistance(s), contact resistance(s), variation in transistor dimension(s), random dopant fluctuation etc.). For simplicity, only transistor gain and threshold will be discussed hereinafter as primary examples.

The manufacturing tolerances associated with each of the inverters 101_1 through 101_4 of FIG. 1 and/or the wiring and circuitry between them should result in each of the four different driving/receiving inverter combinations 105 through 108 exhibiting a different characteristic time at which the driving inverter is able to flip the receiving inverter.

The different times at which each different driving/receiving inverter combinations 105 through 108 is able to flip its receiving driver may be captured and saved in a state circuit 104 (i.e., a circuit that holds some form of state information such as a register). For example, a circuit may be designed that effectively measures the time to flip inverter 101_1 or 101_2 for each of the four loops 105 through 108 ("flip time") and stores the flip time in a register 104. The register 104 includes four separate storage regions to store the characteristic flip time of each of the four different driving/receiving inverter combinations 105 through 108.

Alternatively, each of the four different combinations 105 through 108 of driving and receiving inverter lasts long enough to oscillate at a frequency that is characteristic of the combination. The frequency and/or period of oscillation is then measured for each combination and stored in the register 104. Further still, a clock may drive the selection circuitry 103 to switch between the four driving/receiving inverter combinations 105 through 108 at some frequency. The data produced at the output of multiplexer 102_2 is sampled and stored in the register 104. Here, the sampled data will be some function of the frequency at which samples are taken, the frequency at which the multiplexed paths are switched and the unique oscillation frequency of each of the four different driving/receiving inverter paths 105 through 108.

Regardless of how the circuit is measured, the complete data content of the register 104 can be viewed as a "signature code" for the overall circuit 100 that represents the different combination of gain and threshold values of the circuit's constituent inverters 101_1 through 101_4 (as well as other possible manufacturing related properties) that are a result of the tolerances of the manufacturing process used to manufacture the circuit.

Figure 2:
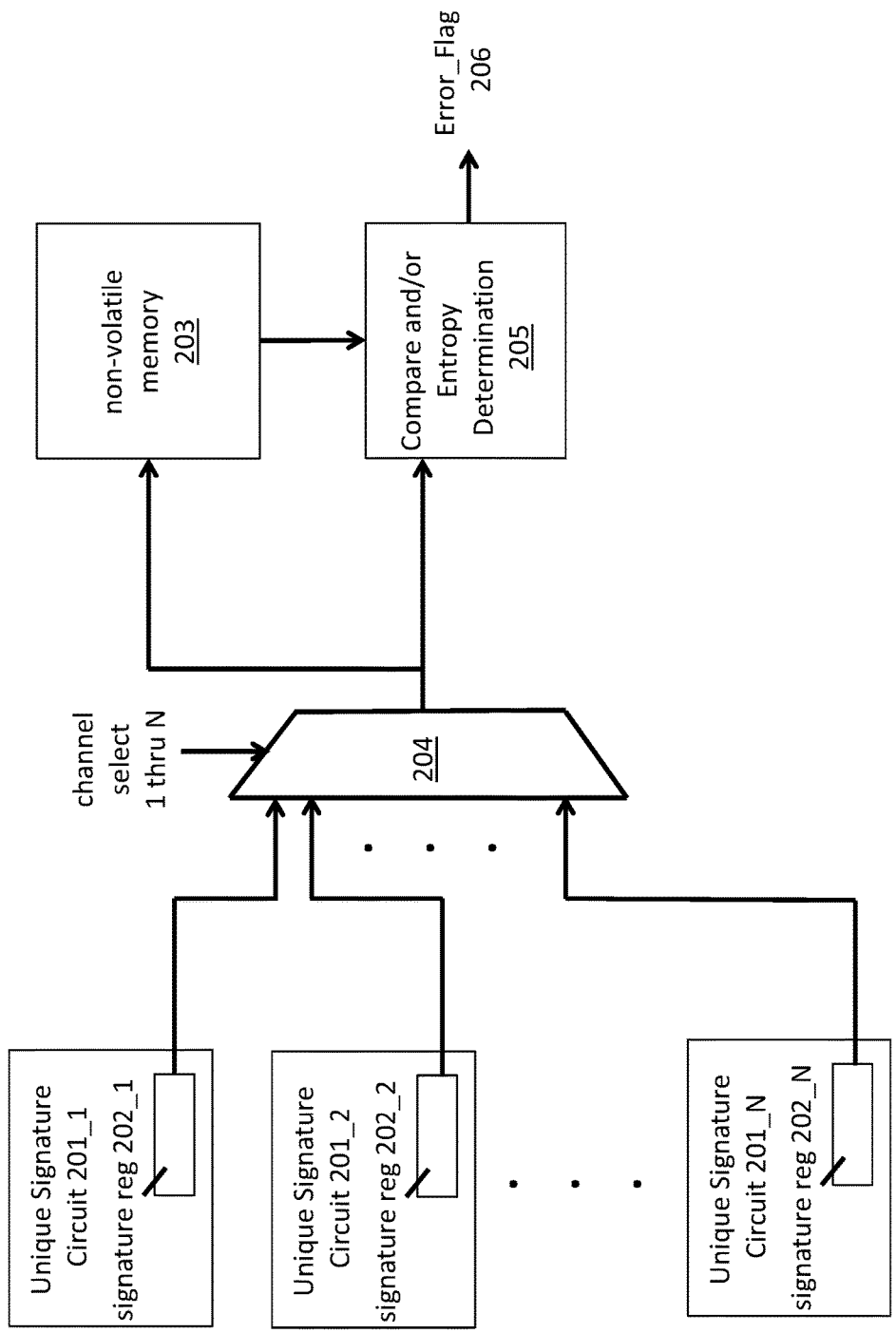
FIG. 2 shows a circuit that detects an error based on a plurality of signature codes.

FIG. 2 shows a circuit having N multiple instances 201_1 through 201_N of a circuit, such as the circuit described just above, having a unique manufacturing tolerance related code. In an embodiment, the circuits 201_1 through 201_N are integrated on a same semiconductor chip whereas in other embodiments the circuits may be integrated on a same printed circuit board. Each circuit produces a unique code that is a signature of the circuit's unique combination of properties (e.g., threshold, gain) which inevitably has variations associated with semiconductor manufacturing processing. That is, even though the multiple circuits may be integrated on a same semiconductor chip, they should still produce different/unique codes. More specifically, each of circuits 201_1 through 201_N produce a unique code that is dependent on the metrics of the transistors (e.g., gain, threshold) that each circuit is composed of. In turn, the metrics themselves are highly sensitive to manufacturing process variation including variations that may exist on a same die. Each circuit also includes a corresponding register 202_1 through 202_N to store its corresponding circuit's unique code.

In an embodiment, each of the distinctive codes generated by the N circuits 201_1 through 201_N are stored at fabrication, in a separate nonvolatile memory 203. Here, for instance, shortly after manufacture, the unique code from each circuit 201_1 through 201_N may be individually/sequentially read from its corresponding register 202_1 through 202_N, passed through multiplexer 204 and written into nonvolatile memory 203. With the storage of the N individual codes, the nonvolatile memory circuit 203 is essentially storing a signature of the specific distribution of its associated fabrication induced variation properties at the time of manufacture of the semiconductor chip or printed circuit board.

As is known in the art, over the course of time and use, electronic circuitry will degrade such that at least one of its manufacturing related properties will change. As a consequence, the N circuits will begin to demonstrate a change in their behavior and respective signature codes. As such, some nominal or change in the codes may be expected and deemed normal. That having been said, such drift is typically not large.

Note that any such normal drift may not change the overall entropy of the collected measurements (Entropy being a measure of randomness in the data distribution with evenly distributed data having high entropy). Thus as described above, at the time of manufacture, because circuits 201_1 through 201_N are designed to be highly sensitive to manufacturing process parameters with inherent variation, the collected codes from the N circuits should exhibit a high entropy (e.g., a high degree of randomness amongst the codes). Although each circuit's parameters may normally exhibit a slight drift over time, they should drift approximately the same amount in the same direction. As such, the entropy of the different measured codes across the N circuits should remain high even in the face of normal drift.

However, in the case of a reliability problem or manufacturing defect that corresponds to a serious degradation problem, a particular manufacturing related property will not only change but may change more dramatically in a particular direction and/or toward a particular value. Irrespective of the spread in degradation, all the circuits 201_1-201_N will change their values systematically in a given direction (albeit with a different magnitude).

The commonality of dramatic change in each of the N circuits will cause the family of N codes to approach a limited set of codes rather than, e.g., N different codes. That is, the entropy of the codes will continually reduce with time (compared to the values at t=0). For example, even though the N different circuits would ideally produce N different codes at their time of manufacture (where N is some large number, e.g., in the hundreds), with field product use and aging all the circuits will face a common reliability problem and as a collective whole only generate a few select codes (e.g., 10 unique codes or less) due to a decrease in the entropy.

FIG. 3 shows a simplistic example. Here, graph 301 shows a high entropy spread of different codes that are generated at the time of manufacture. By contrast, graph 302 shows a low entropy graph in which the totality of different circuits predominantly present only a few different codes owing to the dominance of the underlying failure mechanism or reliability problem that is emerging in the circuitry.

In an embodiment, the circuitry of FIG. 2 includes comparison circuitry 205 that repeatedly causes the N circuits 201_1 through 201_N to generate a fresh new code and compares each of their newly produced codes against the time of manufacture codes that are stored in the nonvolatile memory 203. In an embodiment, if the trend of FIG. 3 is observed from the comparison, an error flag 206 is raised that is, e.g., reported to operating system software (e.g., by being written into a register) or some other resource that is designed to handle a reliability warning.

Note that in some embodiments the storage of the codes in the nonvolatile memory may not even be necessary. That is, during the life usage of the circuit, only the entropy of the generated codes is measured. If after a fresh reading of new codes the entropy of the N codes is deemed to have changed by a specific relative magnitude, an error flag is raised. In this case, no comparison against previously generated codes is even necessary.

The comparison and/or entropy determination circuitry 205 may be implemented, e.g., as a custom designed hardware circuit, a programmable logic circuit (e.g., a programmable logic array (PLA) or programmable logic device (PLD)), a controller or processor that executes firmware, software or other program code that when executed contributes to the comparison/entropy analysis function and/or some combination of any of these.

Regardless of how a decision is made regarding whether the error flag 205 should be raised or not, in an embodiment, if an error is raised, the codes from the N circuits are sequentially read out and written into the nonvolatile memory 203 so that, e.g., a failure analysis can be subsequently entertained in which the specific numeric code values associated with the error can be later studied to verify or understand the type of failure mechanism that has occurred. Here, for example, designers of the code generation circuitry can simulate its behavior and even predict or otherwise correlate specific generated code values with specific types of failure mechanisms.

For simplicity of drawing, an externally exposed output data path from the nonvolatile memory 203 is not shown in FIG. 2. The externally exposed output data path may be used to read-out not only code values corresponding to an error condition, but also, can be used to read-out code values from an earlier time (e.g., time of manufacture) before the newly generated error associated codes are written over the same in the nonvolatile memory 203.

In further or alternative embodiments, the generation of the error flag may not be enough to raise a true error warning to the operating system or system malfunction. For example, if error flag 205 is raised by the circuit of FIG. 2, additional "sanity checks" may be implemented to test whether or not the error make sense. Examples include invoking a inquiry into the data of other sensors of the system such as one or more of the following: 1) a timer to measure the system total run time (e.g., in power on hours); 2) a current monitor that measures the current draw from a power supply, a semiconductor chip and/or one or more specific circuits (e.g., where the current draw is recorded over the lifetime of the system); 3) a supply voltage that measures the supply voltage provided to the system (e.g., where the supply voltage is recorded over the lifetime of the system); 4) a temperature sensor that measures the temperature of the system and/or a semiconductor chip with the system (e.g., where the temperature is recorded over the lifetime of the system); 5) rate of ECC errors at nodes within the system (e.g., where the ECC counts and/or rates are recorded over the lifetime of the system).

Thus, upon receiving an error condition from error flag 205, the error handling procedures may further include additional analysis into any one or more of these parameters (and/or one or more parameters that similarly shed light onto a potential reliability issue) seeking confirmation that a reliability issue could or is likely to be in play. For example, if recorded temperatures indicate the system has been running at high temperatures for an extended period of time, the error handling procedure may choose to confirm that the error flag 205 is warranted and raise a true error to system management.

Figure 4:
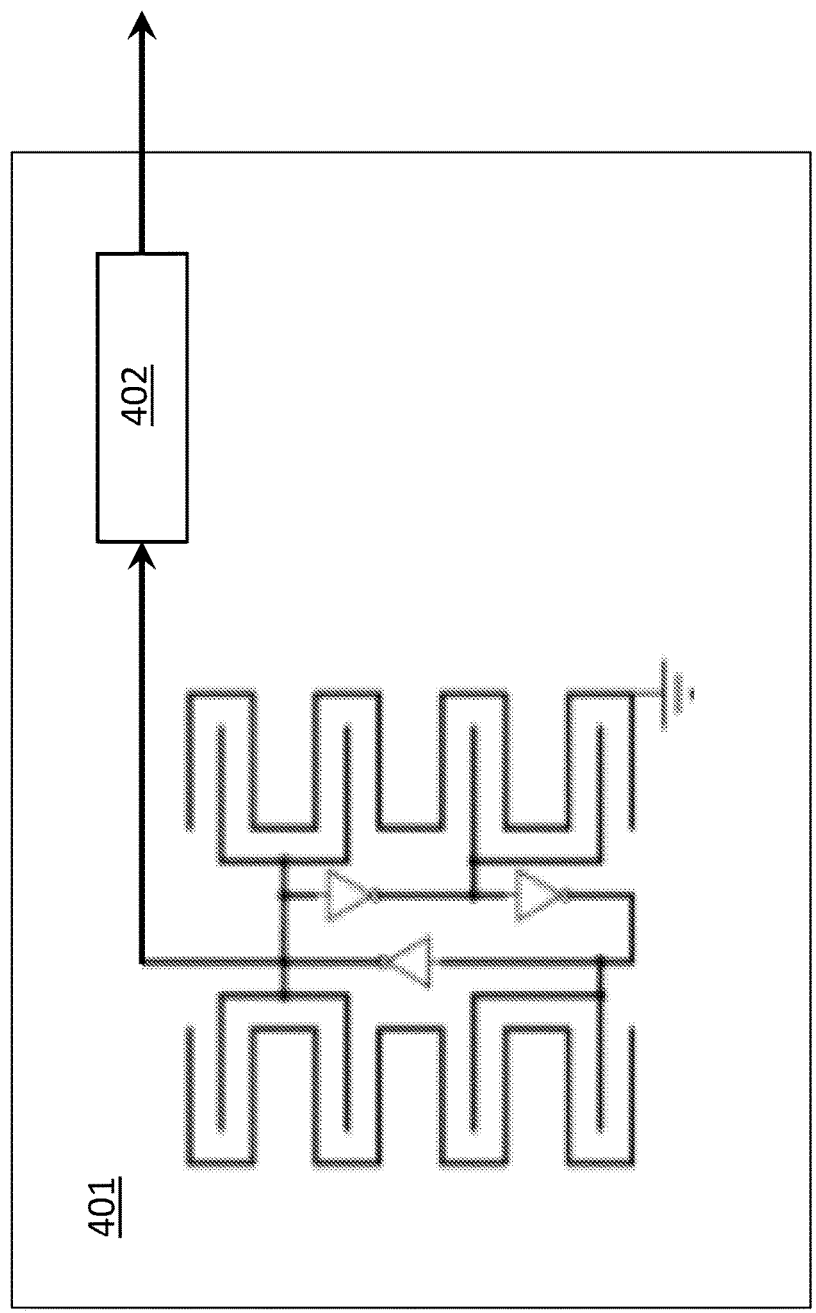
FIG. 4 shows a signature code generation circuit for a printed circuit board.

FIG. 4 shows an embodiment of a signature code circuit 401 for a printed circuit board. As observed in FIG. 4, the signature code circuit includes an oscillating inverter chain where the delay/load between inverters is a function of a specially crafted capacitive network consisting of fingers that extend from the signal lines coupled between inverters into a surrounding ground trace structure. The capacitances of these structures will be highly dependent on the printed circuit board manufacturing tolerances (e.g., dielectric material composition tolerances, wiring dimension tolerances, wiring separation tolerances, etc.) and, as such, will effect inverter flip times in ways that are similar to the discussion provided above with respect to the circuit 100 of FIG. 1.

Here, the flip times of the inverter chain, the frequency of oscillation and/or some other parameter that is dependent of the delay/load capacitances is recorded in a register 402 to provide the characteristic signature of the circuit 400 of FIG. 4. As such, the circuit of FIG. 2 is easily extended to not only semiconductor chips but also printed circuit boards.

Figure 5:
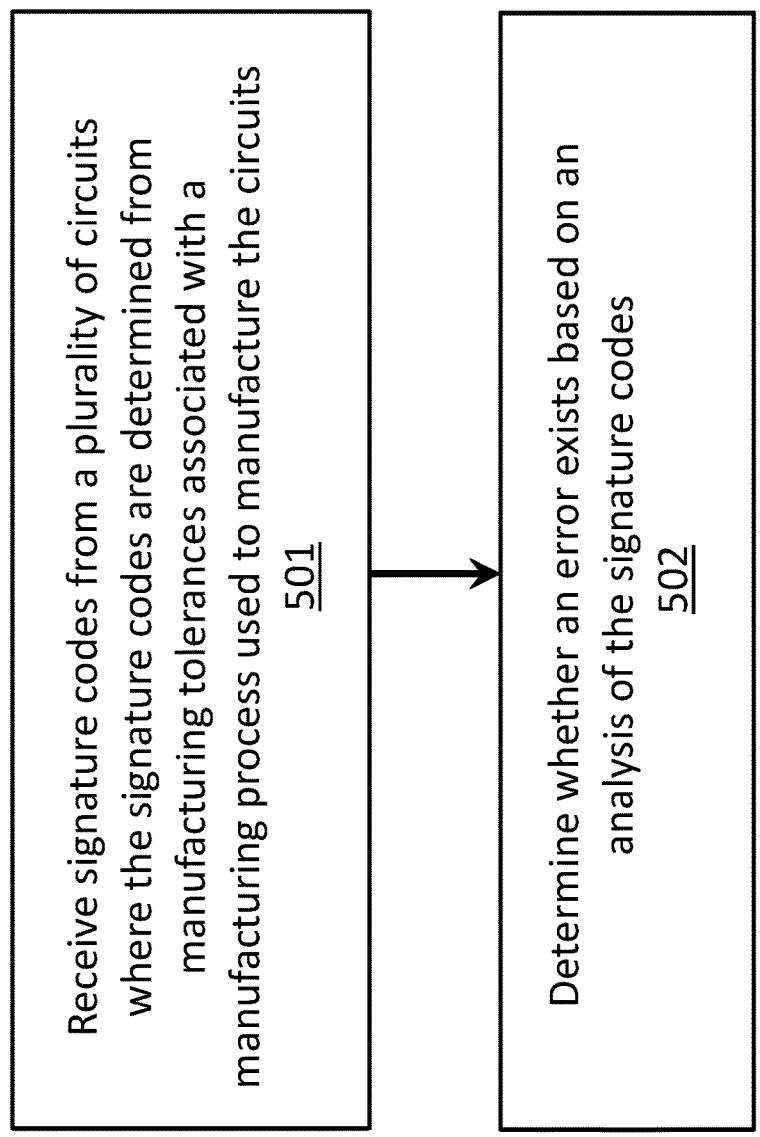
FIG. 5 shows a methodology to detect an error based on a plurality of signature codes.

FIG. 5 shows a methodology described above. According to the methodology of FIG. 5, the method includes receiving signature codes from a plurality of circuits where the signature codes are determined from manufacturing tolerances associated with a manufacturing process used to manufacture the circuits 501. The method further includes determining whether an error exists based on an analysis of the signature codes 502. As alluded to above, the method may be performed entirely in hardware, entirely is software/firmware or some combination of the two.

Figure 6:
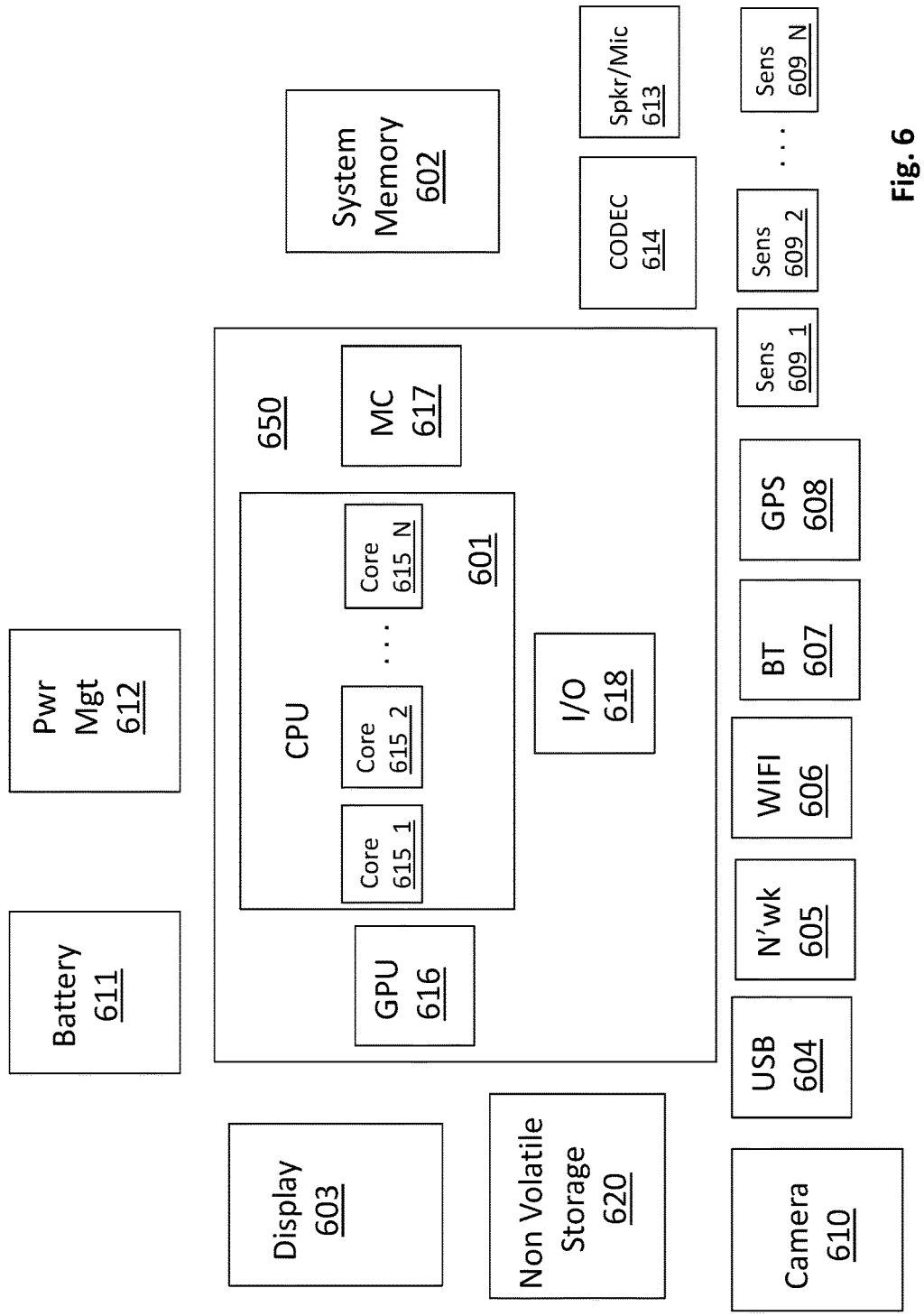
FIG. 6 shows a computing system.

FIG. 6 shows a depiction of an exemplary computing system 600 such as a personal computing system (e.g., desktop or laptop) or a mobile or handheld computing system such as a tablet device or smartphone, or, a larger computing system such as a server computing system. The computing system may contain a package structure as described above.

As observed in FIG. 6, the basic computing system may include a central processing unit 601 (which may include, e.g., a plurality of general purpose processing cores and a main memory controller disposed on an applications processor or multi-core processor), system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_N (e.g., one or more of a gyroscope, an accelerometer, a magnetometer, a temperature sensor, a pressure sensor, a humidity sensor, etc.), a camera 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing units 616 typically execute graphics intensive functions to, e.g., generate graphics information that is presented on the display 603. The memory control function 617 interfaces with the system memory 602. The system memory 602 may be a multi-level system memory.

Each of the touchscreen display 603, the communication interfaces 604-607, the GPS interface 608, the sensors 609, the camera 610, and the speaker/microphone codec 613, 614 all can be viewed as various forms of I/O (input and/or output) relative to the overall computing system including, where appropriate, an integrated peripheral device as well (e.g., the camera 610). Depending on implementation, various ones of these I/O components may be integrated on the applications processor/multi-core processor 650 or may be located off the die or outside the package of the applications processor/multi-core processor 650.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a plurality of circuits each designed to exhibit a unique signature code that is dependent on parameters of a manufacturing process used to manufacture the plurality of circuits;
entropy determination circuitry to determine a potential reliability problem has arisen based on a change in signature codes from the plurality of circuits characterized by high entropy amongst the signature codes during normal drift of the parameters owing to degradation of the plurality of circuits to low entropy amongst the signature codes owing to a significant change in at least one of the parameters, wherein, the high entropy amongst the signature codes is characterized by a larger disparity in different signature codes than the low entropy amongst the signature codes.

2. The apparatus of claim 1 further comprising a memory to store the signature codes.

3. The apparatus of claim 2 wherein the memory is a nonvolatile memory.

4. The apparatus of claim 2 wherein the memory is coupled to the error circuitry.

5. The apparatus of claim 1 wherein the plurality of circuits and the entropy determination circuitry are implemented on a semiconductor chip.

6. The apparatus of claim 1 wherein the plurality of circuits and the entropy determination circuitry are implemented on a printed circuit board.

7. The apparatus of claim 1 wherein the entropy determination circuitry is implemented with any one or more of:
custom designed circuitry;
programmable logic circuitry;
program code.

8. A computing system, comprising:
one or more processing cores;
a memory controller coupled to the one or more processing cores; a system memory coupled to the memory controller;
a display;
a network interface;
a plurality of circuits each designed to exhibit a unique signature code that is dependent on parameters of a manufacturing process used to manufacture the plurality of circuits; and,
entropy determination circuitry to determine a potential reliability problem has arisen based on a change in signature codes from the plurality of circuits characterized by high entropy amongst the signature codes during normal drift of the parameters owing to degradation of the plurality of circuits to low entropy amongst the signature codes owing to a significant change in at least one of the parameters, wherein, the high entropy amongst the signature codes is characterized by a larger disparity in different signature codes than the low entropy amongst the signature codes.

9. The computing system of claim 8 further comprising a memory to store the signature codes.

10. The computing system of claim 9 wherein the memory is a nonvolatile memory.

11. The computing system of claim 9 wherein the memory is coupled to the error circuitry.

12. The computing system of claim 8 wherein the plurality of circuits and the entropy determination circuitry are implemented on a semiconductor chip.

13. The computing system of claim 8 wherein the plurality of circuits and the entropy determination circuitry are implemented on a printed circuit board.

14. The computing system of claim 8 wherein the entropy determination circuitry is implemented with any one or more of:
custom designed circuitry;
programmable logic circuitry;
program code.

15. A non-transitory machine readable storage medium containing program code that when processed by a processor causes a method to be performed, wherein the method comprises:
receiving signature codes from a plurality of circuits where the signature codes are dependent on parameters of the manufacturing process used to manufacture the plurality of circuits; and,
determining whether an error exists based on an entropy analysis of the signature codes characterized by high entropy amongst the signature codes during normal drift of the parameters owing to degradation of the plurality of circuits to low entropy amongst the signature codes owing to a significant change in at least one of the parameters, wherein, the high entropy amongst the signature codes is characterized by a larger disparity in different signature codes than the low entropy amongst the signature codes.

16. The machine readable medium of claim 15 wherein the determining includes comparing the signature codes against earlier versions of the signature codes.

17. The machine readable medium of claim 15 wherein the determining includes determining an entropy of the signature codes.

18. The machine readable medium of claim 15 wherein the plurality of circuits are manufactured on any of:
a semiconductor
chip; a printed circuit
board.

* * * * *